United States Patent [19]
McMillan et al.

[11] Patent Number: 4,870,991
[45] Date of Patent: Oct. 3, 1989

[54] LAWN SPRINKLER FERTILIZER DEVICE

[76] Inventors: Thomas A. McMillan, 101 Dory Rd., North Palm Beach, Fla. 33408; Henry W. Mitchell, 9744 Dogwood Ave., Palm Beach Gardens, Fla. 33410

[21] Appl. No.: 233,259
[22] Filed: Aug. 17, 1988
[51] Int. Cl.[4] ............................................. F16K 31/18
[52] U.S. Cl. ............................ 137/624.12; 137/413; 239/70; 239/310
[58] Field of Search ................. 137/624.11, 412, 413, 137/429, 624.12, 624.14; 239/10, 310, 70

[56] References Cited

U.S. PATENT DOCUMENTS

| | | | |
|---|---|---|---|
| 3,843,056 | 10/1974 | Nye | 239/70 |
| 4,121,767 | 10/1978 | Jensen | 239/310 |
| 4,456,176 | 6/1984 | Agius | 239/310 |
| 4,545,396 | 10/1985 | Miller et al. | 239/310 |
| 4,768,712 | 9/1988 | Terrell | 137/624.12 |

Primary Examiner—A. Michael Chambers
Attorney, Agent, or Firm—Jack N. McCarthy

[57] ABSTRACT

An apparatus for directing a liquid fertilizer into an irrigation system having a liquid fertilizer flow conduit with the valve of a solenoid valve and the float of a float switch located in series and an electric circuit with the switch of the float switch, solenoid of the solenoid valve and automatic timer device in series. The apparatus directs fertilizer therethrough when electricity is delivered to the switch, solenoid, and automatic timer device when the switch is closed by the float and the timer is conducting electricity.

18 Claims, 3 Drawing Sheets ium 4,870,991

LAWN SPRINKLER FERTILIZER DEVICE

TECHNICAL FIELD

This invention relates to the control of the addition of a fertilizer to a lawn sprinkler system.

BACKGROUND ART

Various complicated automatic devices have been used to fertilize or debug large areas but no actual device is known that will integrate a lawn watering system to fertilize when desired as disclosed herein. The following patents were uncovered in a search: U.S. Pat. Nos. 2,600,877; 3,370,571; 3,380,468; 4,026,673; and 4,391,390.

DISCLOSURE OF INVENTION

An object of the present invention is to provide a device which can inject a predetermined amount of fertilizer in a predetermined time into the water being directed to a specific area.

Another object of this invention is to provide a device which can be added to an existing lawn sprinkler system, as well as being part of an original installation.

Another object of this invention is to provide a device that will initiate a liquid fertilizer flow into the water flowing to a lawn at the time the system is turned on, and have it flow for a predetermined period.

A further object of this invention is to provide a device which can provide for the injection of a fertilizer into a system having means for distributing water at spaced times into a plurality of zones, each injected amount of fertilizer for each zone being injected for the same period of time at the beginning of the longer time period set for the injection of the water to a zone.

Another object of this invention is to provide for repeating a timed release of fertilizer into the water being delivered to a pump for distribution to a specific area when the output of the pump is stopped and then started to direct the water to another area.

BEST MODE FOR CARRYING OUT THE INVENTION

Figure 2:
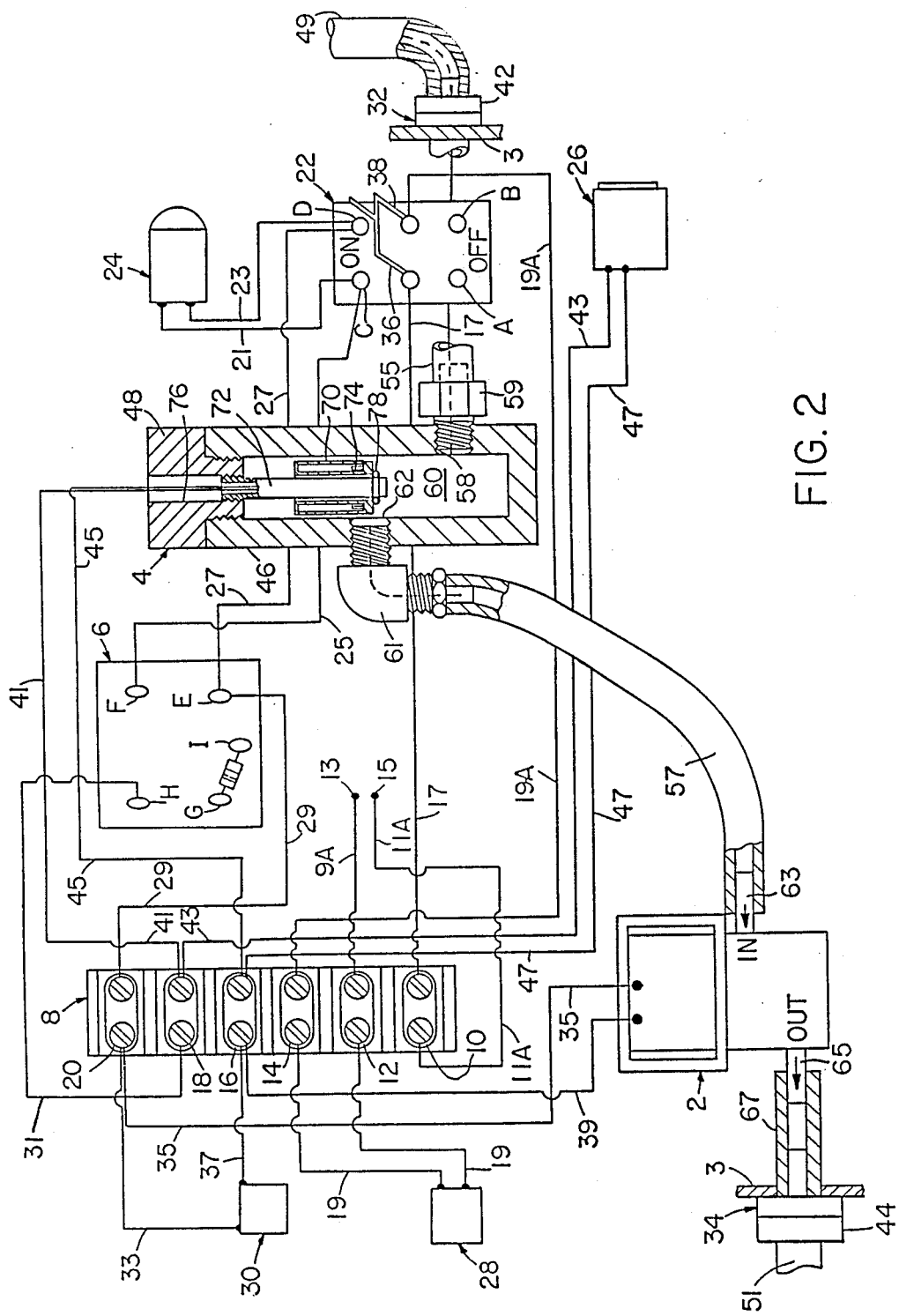
FIG. 2 is a generally schematic view of the lawn sprinkler fertilizer device included in FIG. 1.

As seen in FIG. 2, the lawn sprinkler fertilizer device 1 comprises eleven (11) main elements therein:
 (1) a solenoid valve 2;
 (2) a float switch device 4;
 (3) an electronic timer device 6;
 (4) a bus bar 8 having six buses 10, 12, 14, 16, 18 and 20;
 (5) an on-off switch 22;
 (6) an "armed" light 24,
 (7) a primer switch 26;
 (8) a fuse receptacle 28;
 (9) a system "on" light 30:
 (10) a fluid inlet connector 32; and
 (11) a fluid outlet connector 34.

Figure 1:
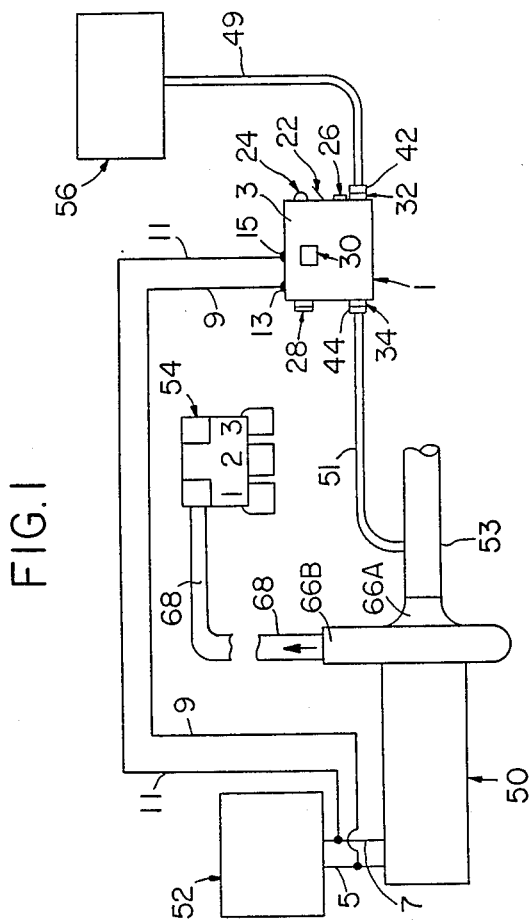
FIG. 1 is a schematic view of a typical irrigation system including a lawn sprinkler fertilizer device.

FIG. 1 shows a typical irrigation system having a pump 50, a twenty-four (24) hour timer device 52, and a sequencing distributing valve 54. The timer device 52 is of the type which can be set to turn a pump 50 "on" and then "off" after a predetermined length of time. Where a lawn (or area to be irrigated) is large, it is usually divided into three (3) or four (4) zones, depending on the water supply. The sequencing distributing valve 54 shown is a three-zone valve. Where there are multiple zones for irrigating a lawn, it is necessary that the timer device 52 be capable of providing a plurality of "on-off" time periods; in this case, three—one for each zone. A timer device capable of providing a plurality of "on-off" time periods, each of a desired length, is shown in U.S. Pat. No. 4,029,918 and a sequencing distributing valve capable of providing water to three zones is shown in U.S. Pat. No. 4,125,124.

The twenty-four (24) hour timer device, when it goes "on" at its designated time, connects a voltage source to the pump 50 by electrical lines 5 and 7. Electrical lines 9 and 11 connect lines 5 and 7, respectively, to connectors 13 and 15 on the lawn sprinkler fertilizer device 1.

Within the housing 3 of the lawn sprinkler fertilizer device 1 the connector 13 is connected to one end of bus 12 by electrical line 9A and the connector 15 is connected to one end of bus 10 by electrical line 11A. The other end of bus 10 is connected to the pivotal end of one pivoted connector 36 of single throw double connector switch 22 by electrical line 17, while the other end of bus 12 is connected to one end of bus 14 by electrical line 19. A fuse receptacle 28, having a fuse is located in line 19. The other end of bus 14 is connected to the pivotal end of the other pivoted connector 38 of switch 22 by electrical line 19A.

When the pivoted connectors 36 and 38 of switch 22 are positioned to engage unused contacts A and B, the switch 22 is in an off position and the sprinkler fertilizer device 1 is off. Contacts C and D of switch 22 are each connected to the armed light 24 by electrical lines 21 and 23 for turning it on. When the pivoted connectors 36 and 38 of switch 22 are positioned to engage contacts C and D, the switch is in an on position and the armed light 24 is in an on position.

Contacts C and D are also connected to terminals F and E, respectively, of the electronic timer device 6 by electrical lines 25 and 27. Terminal I is connected to terminal G through a resistor 40. Terminal E is connected to one end of bus 20 by an electrical line 29 and terminal H is connected to one end of bus 18 by an electrical line 31.

The other end of bus 20 is connected to one contact on the system "on" light 30 by an electrical line 33 and also connected to one contact on normally closed (for example, biased closed) solenoid valve 2 by an electrical line 35. The other contact on the system "on" light 30 and the other contact on the solenoid valve 2 are connected to one end of bus 16 by electrical lines 37 and 39, respectively. When the system "on" light 30 is on, electricity is directed to the solenoid valve 2 and it is moved to an open position by its solenoid, as will be hereinafter described.

The other end of bus 18 is connected to one electrical line 41 extending from the float switch device 4, and also connected to one electrical line 43 extending from the primer switch 26. Another electrical line 45 on the float switch device 4 and another electrical line 47 on the primer switch 26 are connected to one end of bus 16, respectively.

The lawn sprinkler fertilizer device 1 has the system "on" light 30 mounted on the front removable panel of a housing 3, and the armed light 24, on-off switch 22 and primer switch 26 mounted on one side of the housing 3; the fuse receptacle 28 is mounted on the other side for easy accessibility. However, these indicating lights and controls can be mounted at different locations as desired.

An inlet connector 32 and an outlet connector 34 are mounted one on each side of the housing 3. Inlet connector 32 is connected by a conduit connector 42 to conduit 49 which is in turn connected to a supply of liquid fertilizer; a reservoir 56 is shown in FIG. 1. Outlet connector 34 is connected by a conduit connector 44 to a conduit 51 which is in turn connected to an inlet pipe 53 connecting a water supply to the inlet of the pump 50. The water supply can be a town water system or a separate well. The reservoir 56 is preferably located above the lawn sprinkler fertilizer device 1 to provide liquid fertilizer to the float switch 4 by gravity.

Within the housing 3 of lawn sprinkler fertilizer device 1, float switch device 4 and solenoid valve 2 are mounted and connected in series. Float switch device 4 has a cylindrical housing 46 with a cylindrical bore 60 therein with its axis positioned in a vertical direction; an inlet 58 extends through the side of the cylindrical housing 46 to the cylindrical bore 60 and an outlet 62 extends through the side of the cylindrical housing 46 to the cylindrical bore 60 above inlet 58 at a midpoint thereof.

A conduit 55 connects inlet connector 32 to the inlet 58 of float switch device 4; a conduit 57 connects the outlet 62 of float switch device 4 to the inlet 63 of the solenoid valve 2; and the outlet 65 of the solenoid valve 2 is connected to the outlet connector 34 by a short conduit 67. The inlet 58 is internally threaded and connected to one end of conduit 55 by a connector 59. The outlet 62 is internally threaded and connected to one end of conduit 57 by connector 61. The top of the cylindrical bore 60 is internally threaded and receives a threaded, removable top 48 which extends into the cylindrical bore 60.

The removable top 48 has an opening 76 therethrough, extending from its top into the cylindrical bore 60 when assembled. A cylindrical switch contact housing member 72 is closed at one end and open with external threads at the other end. This housing member 72 is threadably mounted into internal threads in the bottom of opening 76 in top 48. Cylindrical member 72 has switch contacts therein which are normally open (for example, biased apart) and are moved to a closed position (overcoming the bias), contacting each other, by a magnetic field. Switch contacts are connected, one each to electrical lines 41 and 45, which extend into opening 76 and housing member 72. A slidable float actuator member 70 is positioned in cylindrical bore 60 on cylindrical member 72 extending downwardly from top 48. A snap clip 78 is positioned in a groove around the bottom of cylindrical member 72 to limit the downward movement of slidable float actuator member 70.

Magnets 74 are positioned in float actuator member 70 for actuating the switch contacts. Slidable float actuator member 70 closes the contacts when it is moved to the top of cylindrical bore 60 by fluid in cylindrical housing 46. When fluid does not rise in cylindrical bore 60 to maintain the float actuator 70 in its upper position, movement of the float actuator 70 to the bottom of cylindrical member 72 places it in a location where the magnetic field does not affect the contacts of float switch 4, allowing the contacts to move to their normally open position.

Other types of known float switches can be used. A float directly attached to a mechanically operated switch could be used, where the float in its upper, or floating, position would turn the switch on and in its lower position. indicating no fluid, would turn the switch off.

In lawn irrigation operation, the twenty-four (24) hour timer device 52 turns on the pump 50 for its set period of time and the pump 50 directs water to the sequencing distributing valve 54 to be distributed to its set zone, for example, zone 1, at the same time electricity is sent to the lawn sprinkler fertilizer device 1. If the sequencing distributing valve 54 has three zones the valve 54 will be reset to come on zone 2 when the pump 50 has been turned off by the timer 52. When the pump 50 has been turned on by the timer 52, this directs water to zone 2 and keeps it on for the time set for that zone. When that time period ends, the timer 52 shuts the electricity off to pump 50 and it shuts off flow to sequencing distributing valve 54 which resets it to come on zone 3 at the next initiation of water flow. As the timer 52 initiates water flow, water is directed to zone 3 for the time period set on the timer 52. At the end of the time period, the pump is turned off, and the sequencing distributing valve 54 is reset to come on zone 1 at the next flow of water directed to the valve by pump 50. A valve 54 of this type is referred to above.

When it is desired to fertilize a lawn at the next scheduled time for watering, liquid fertilizer must be placed in the reservoir which will provide the number of zones being used with the desired amount of fertilizer. The electronic timer device 6 is one which can be set to conduct for a desired time period, for example two minutes, and then automatically turn off; it will be reset to conduct for another desired time period when the electricity to it has been turned off. It is then ready to conduct for another two minutes when the electricity to it has been turned on again. The electric timer device 6 used was an off-the-shelf interval delay timer of International Controls and Measurements Corp. Other timer devices which will conduct for a desired time period upon an initiation of a flow of electricity thereto and automatically turn off after the desired time period, and which can be automatically reset to conduct for another desired time period upon cessation of the flow of electricity to the device can be used, as is well known by those skilled in the art.

Having a lawn sprinkler fertilizer device 1 and knowing the amount of fertilizer which is desired to be placed over each of the zones, it is necessary that tests be conducted to determine just what time period should be set on the electronic timer device 6 to distribute the proper amount. The reservoir 56 can be filled with a measured amount of liquid fertilizer and the pump 50 run for at least the time period set on the electronic timer device 6 to determine the amount of liquid fertilizer injected into the water supply in that time period. This test can be repeated until a time period is found which permits the proper amount of fertilizer to be injected. In the device shown, the time period is changed by raising or lowering the value of the resistor 40 between terminals G and I.

For fertilizing operation, the switch 22 on the fertilizer device 1 must be placed in its on position prior to the next scheduled time for watering the lawn (or other area). When the switch 22 is placed in its on position, this connects the armed light 24 across connectors 13 and 15; connector 15 is connected to terminal F of the electronic timer device 6, terminal H is connected to bus 18, and bus 18 is connected to a normally open contact of float switch device 4; connector 13 is connected through fuse receptacle 28 to terminal E of electronic timer device 6 and then to bus 20; bus 20 is connected through "on" light 30 to bus 16 and through the solenoid of solenoid valve 2 to bus 16; bus 16 is connected to the other normally open contact of float switch device 4.

Now it can be seen that if the reservoir 56 has been properly filled, the float actuator member 70 will be raised to the top of the cylindrical member 72 in cylindrical bore 60 closing the normally open contact members. With the contact members of cylindrical member 72 closed when the timer device 52 turns on pump 50, with valve 54 set, for example, to water zone 1, it also:

(a) turns on armed light 24;
(b) turns on "on" light 30;
(c) starts the electronic timer device 6 counting its conducting time period; and
(d) opens solenoid valve 2. Pump 50 pumps water from conduit 53 at its inlet 66A to sequencing distributing valve 54 through outlet 66B and conduit 68, sucking the liquid fertilizer into the conduit 53 and inlet 66A of the pump 50.

When the time period set in the electronic timer device 6 has expired, the connection between terminal F and terminal H ceases to conduct;

(a) turning off "on" light 30; and
(b) closing solenoid valve 2;

the lawn irrigation operation continues until the time period set on the twenty-four (24) hour timer device 52 expires, turning off the pump 50.

Since the electronic timer device 6 was reset to conduct for its preset desired time period when a flow of electricity is again received by the electronic timer device 6, when the twenty-four (24) hour timer device 52 turns on pump 50 again, to send water to zone 2 as set by valve 54, the fertilizer device 1 operates again for zone 2 as it did for zone 1 above. This action can repeat for a multiplicity of zones.

If the fertilizer device 1 runs out of liquid fertilizer due to a miscalculation (or any other reason), the contacts of float switch device 4 will open with the downward movement of the float actuator 70, cutting off the flow of electricity to the electronic timer device 6, closing solenoid valve 2 and turning off "on" light 30.

A primer switch 26 can be provided if the reservoir 56 is located beneath the float switch device 4. If the liquid fertilizer has been drained from the conduit means between the reservoir 56 and the solenoid valve 2, the primer switch 26 can be pressed to bypass the open contacts of the float switch device 4 and open the solenoid valve 2 to suck water from the reservoir 56 into the pump 50 through the cylindrical bore 60, moving the contact of float switch device 4 to a closed position by the magnetic field, thereby priming the fertilizer device 1.

Figure 3:
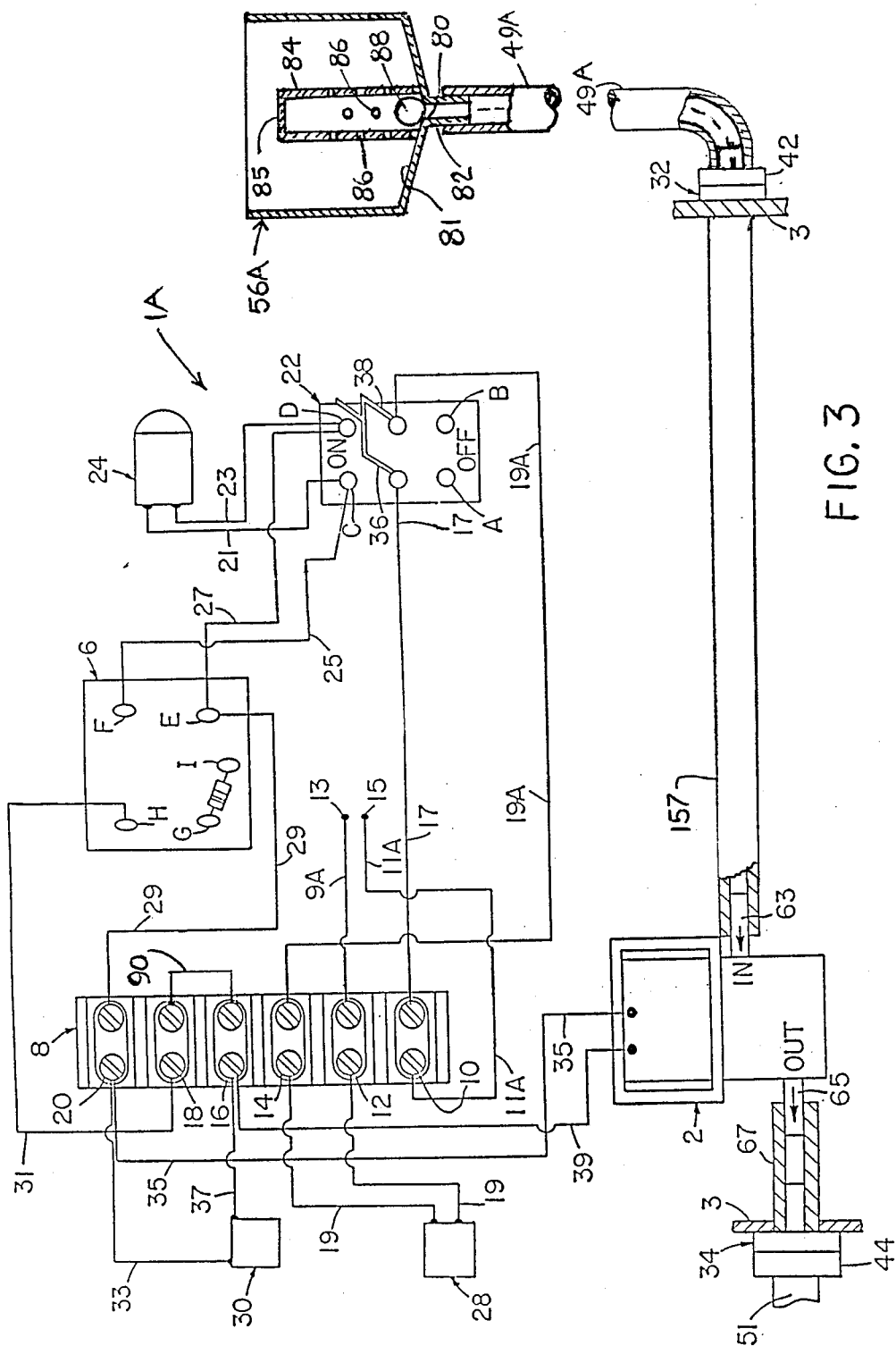
FIG. 3 is a modification of the fertilizer device of FIG. 2.

A second modification of the fertilizer device is shown in FIG. 3 as 1A. This second modification is used with a reservoir 56A which must be located above the lawn sprinkler fertilizer device 1A to provide liquid fertilizer to the solenoid valve 2 by gravity. The reservoir 56A has an outlet 80 located at the low point of its funnel-shaped bottom 81. A cylindrical extension 82 extends from the outlet 80 and is attached to a fluid inlet connector 32 by a conduit 49A and conduit connector 42, this connection being the same as in FIG. 2.

The reservoir 56A is constructed having a cylindrical member 84 positioned over the outlet 80 and having a diameter slightly larger than the outlet 80. The cylindrical member 84 has a top 85 to maintain a flotation ball 88 therein and has a plurality of openings 86 to permit liquid in the reservoir 56A to gain entrance to the interior of the cylindrical member 84 to raise said ball 88 and flow through the outlet 80 to the fertilizer device 1A. When said reservoir 65A is empty, the ball 88 closes said outlet 80.

In this second modification the float switch device 4 in FIG. 2 is removed along with conduit 55 and conduit 57 and replaced by a single conduit 157. Electrical lines 41 and 45 are also removed. Along with the float switch device 4, the primer switch 26 is also removed with electrical lines 43 and 47. Bus 16 and bus 18 are connected by an electrical line 90 to connect electrical conduits 37 and 39 to electrical conduit 31 at all times. The remaining parts of the fertilizer device, as shown in FIG. 2, perform the same function as before. The manner of loading the reservoir 56A with a proper amount of liquid fertilizer is the same as used for reservoir 56.

For fertilizing operation in the second modification, the switch 22 on the fertilizer device 1A must be placed in its "on" position prior to the next scheduled time for watering the lawn (or other area). When the switch 22 is placed in its "on" position, this connects the armed light 24 across connectors 13 and 15; connector 15 is connected to terminal F of the electronic timer device 6, terminal H is connected to bus 18, and bus 18 is connected to bus 16; connector 13 is connected through fuse receptacle 28 to terminal E of electronic timer device 6 and then to bus 20; bus 20 is connected through "on" light 30 to bus 16 and through the solenoid of solenoid valve 2 to bus 16.

Now it can be seen that if the reservoir 56A has been properly filled, the ball 88 will be raised to the top of the cylindrical member 84, permitting liquid fertilizer to flow to the closed solenoid valve. When the timer device 52 turns on pump 50, with valve 54 set, for example to water zone 1, it also:

(a) turns on armed light 24;
(b) turns on "on" light 30;
(c) starts the electronic timer device 6 counting its conducting time period; and
(d) opens solenoid valve 2. Pump 50 pumps water from conduit 53 at its inlet 66A to sequencing distributing valve 54 through outlet 66B and conduit 68, sucking the liquid fertilizer through conduit 51 into the conduit 53 and inlet 66A of the pump 50.

When the time period set in the electronic timer device 6 has expired, the connection between terminal F and terminal H ceases to conduct;

(a) turning off "on" light 30: and
(b) closing solenoid valve 2;

the lawn irrigation operation continues until the time period set on the twenty-four (24) hour timer device 52 expires, turning off the pump 50.

Since the electronic timer device 6 was reset to conduct for its preset desired time period when a flow of electricity is again received by the electronic timer device 6, when the twenty-four (24) hour timer device 52 turns on pump 50 again, to send water to zone 2 as set by valve 54, the fertilizer device 1 operates again for zone 2 as it did for zone 1 above. This action can repeat for a multiplicity of zones.

If the fertilizer device 1A runs out of liquid fertilizer due to a miscalculation (or any other reason the ball 88 closes outlet 80 to prevent air from being drawn into the pump 50.

While the word "fertilizer" has been used, it is to be understood that all liquid additives for an irrigation system are included, such as additives for bug and insect extermination.

We claim:

1. An apparatus for directing a liquid additive into an irrigation system for covering a specific area including conduit means for directing a flow of liquid additive therethrough, said conduit means having an inlet and an outlet; a float switch device; solenoid valve means; said float switch device having an electric switch and a float in a chamber for actuating it; said solenoid valve means having an on-off valve and a solenoid for actuating it; said chamber and on-off valve being located in series in said conduit means; an electrical circuit means for opening and closing said solenoid valve; said electrical circuit means having an on-off switch for connection to a electrical source, an automatic timer device for conducting electricity therethrough for a predetermined period of time after electricity has been directed thereto then automatically stopping the flow of electricity; said on-off switch, automatic timer device, solenoid, and electric switch being in series in said electrical circuit means.

2. A combination as set forth in claim 1 wherein a primer switch is placed in parallel with said electric switch of said float switch device, said switch being manually operable to bypass the electric switch of said float switch device if the electric switch did not close during normal operation.

3. A combination as set forth in claim 1 including a pump, said pump having an inlet and an outlet, a water supply connected to said pump inlet, a flow distribution valve means for distributing flow to a multiplicity of zones at spaced times, the outlet of said pump being directed to said flow distribution valve means, the outlet of said conduit means being connected to said pump inlet for providing a suction in said conduit means from said outlet.

4. A combination as set forth in claim 1 wherein said chamber forms part of said conduit means for directing a flow of liquid additive.

5. A combination as set forth in claim 4 wherein said chamber is cylindrical and placed in a vertical position, said chamber having a chamber inlet connected to said inlet of said conduit means, said chamber having a chamber outlet above the chamber inlet connected to said outlet of said conduit means, said float of said float switch device being cylindrical and mounted for vertical movement in said cylindrical chamber between an upper and lower position, said vertical movement of said float to said upper position actuating said electric switch to connect said automatic timer device to said solenoid.

6. An irrigation fertilizer system including a pump having an inlet and outlet, a sequencing distributing valve for directing water flow to a multiplicity of zones, first conduit means connected to said pump inlet for directing water thereto, second conduit means connecting said pump outlet to said sequencing distributing valve, a first timer for turning said pump on and off to pump water to said sequencing distributing valve for each of said multiplicity of zones for a given time period, a reservoir for liquid fertilizer, a fertilizer device connected between said reservoir and said pump inlet having a third conduit means therethrough for directing a liquid fertilizer from said reservoir to said pump inlet to be delivered to each of said multiplicity of zones, said first timer also directing electricity to said fertilizer device each time it turns on said pump for connecting said reservoir to the inlet of said pump, a second timer in said fertilizer device for opening said fertilizer device for a short period of time each time electricity is directed to said fertilizer device.

7. A combination as set forth in claim 6 including a float switch device in said fertilizer device, said float switch device having a normally open electric switch and a float in a chamber for actuating it, said chamber being located in said third conduit means so that liquid fertilizer in said chamber will cause said float to close said normally open electric switch, said normally open electric switch being located in series with said second timer.

8. A combination as set forth in claim 7 wherein said reservoir is located above the float switch device to provide liquid fertilizer to the float switch device by gravity.

9. A combination as set forth in claim 6 including a solenoid valve means having an on-off valve and a solenoid for actuating it, said on-off valve being located in said third conduit means to open and close said third conduit means, said solenoid being located in series with said second timer.

10. A combination as set forth in claim 6 including a float switch device in said fertilizer device, said float switch device having a normally open electric switch and a float in a chamber for actuating it, a solenoid valve means, said solenoid valve means having an on-off valve and a solenoid for actuating it, said chamber and said on-off valve being located in series in said third conduit means, liquid fertilizer in said chamber will cause said float to close said normally open electric switch, said normally open electric switch and said solenoid being located in series with said second timer, said on-off valve only being open when said normally open electric switch is closed and said second timer is conducting.

11. A combination as set forth in claim 6 wherein said first timer controls the timed flow of water to a zone, and said second timer independently controls the timed flow of a liquid fertilizer to a zone during the timed flow of water.

12. A combination as set forth in claim 6 wherein said third conduit means has a liquid fertilizer sensing means for sensing the presence of a liquid fertilizer in said third conduit means and an on-off valve downstream thereof in said third conduit means, a solenoid for actuating said on-off valve, said liquid fertilizer sensing means having an electric switch which is closed by the presence of a liquid fertilizer in said third conduit means, said electric switch and solenoid being located in series with said second timer so that said second timer can open said on-off valve when a liquid fertilizer is in said third conduit means.

13. A combination as set forth in claim 12 wherein said third conduit means is connected with said first conduit means adjacent said pump inlet, said on-off valve being located between said liquid fertilizer sensing means and said first conduit means, said liquid fertilizer sensing means being located downstream of said reservoir for liquid fertilizer.

14. An apparatus for directing a liquid additive into an irrigation system for covering a specific area including conduit means for carrying a flow of liquid additive therethrough, said conduit means having a inlet and an outlet; solenoid valve means; said solenoid valve means having an on-off valve and a solenoid for actuating it; said on-off valve being located in said conduit means; an electrical circuit means for opening and closing said solenoid valve; said electrical circuit means having an on-off switch for connection to an electrical source, an automatic timer device for conducting electricity therethrough for a predetermined period of time after electricity has been directed thereto then automatically stopping the flow of electricity; said on-off switch, automatic timer device, and solenoid, being in series in said electrical circuit means.

15. A combination as set forth in claim 14 including a pump, said pump having an inlet and an outlet, a water supply connected to said pump inlet, a flow distribution valve means for distributing flow to a multiplicity of zones at spaced times, the outlet of said pump being directed to said flow distribution valve means, the outlet of said conduit means being connected to said pump inlet for providing a suction in said conduit means from said outlet.

16. A combination as set forth in claim 15 including a chamber in said conduit means for carrying a flow of liquid additive, a liquid additive reservoir, said inlet of said conduit means being connected to said liquid additive reservoir, a liquid fertilizer sensing means, said liquid fertilizer sensing means having a normally open electric switch and control means in said chamber for actuating said electric switch, said chamber being located in said conduit means so that liquid fertilizer in said chamber will cause said control means to close said normally open electric switch, said normally open electric switch being located in series with said on-off switch, automatic timer device, and solenoid.

17. A combination as set forth in claim 15 including a 24-hour timer device for turning said pump on and off for a plurality of time periods, said 24-hour timer device also directing electricity to said apparatus for directing a liquid additive into an irrigation system for each of said time periods for opening said solenoid valve means and starting said automatic timer device, said automatic timer device closing said solenoid valve automatically at said predetermined time before said 24-hour timer device turns said pump off.

18. A combination as set forth in claim 14 including a chamber in said conduit means for carrying a flow of liquid additive, a liquid additive reservoir, said inlet of said conduit means being connected to said liquid additive reservoir, a liquid fertilizer sensing means, said liquid fertilizer sensing means having a normally open electric switch and control means in said chamber for actuating said electric switch, said chamber being located in said conduit means so that liquid fertilizer in said chamber will cause said control means to close said normally open electric switch, said normally open electric switch being located in series with said on-off switch, automatic timer device, and solenoid.

* * * * *